United States Patent Office

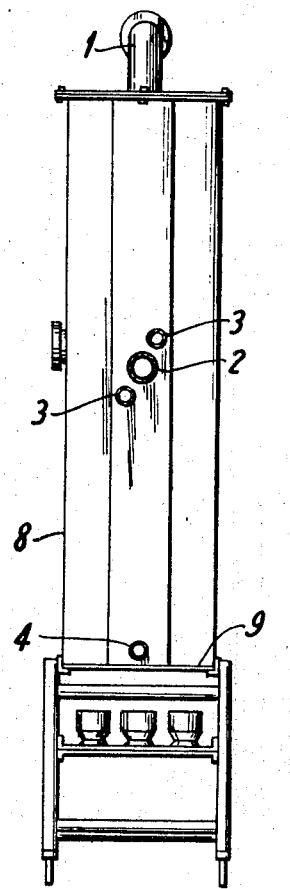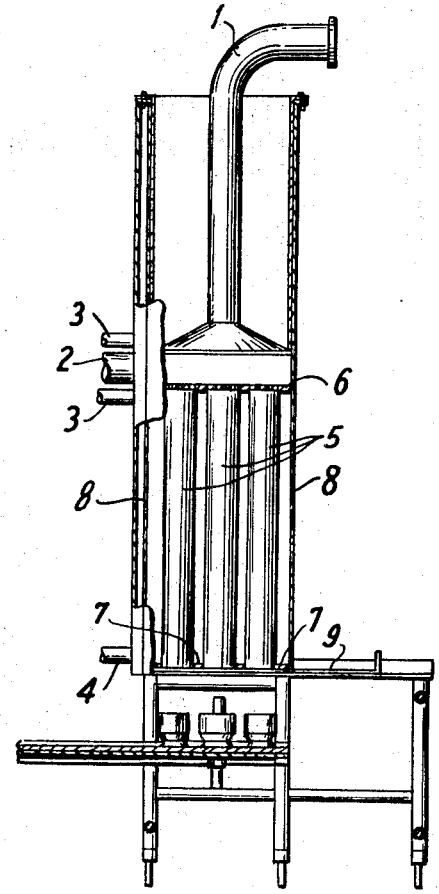
FIG.1A  FIG.1B
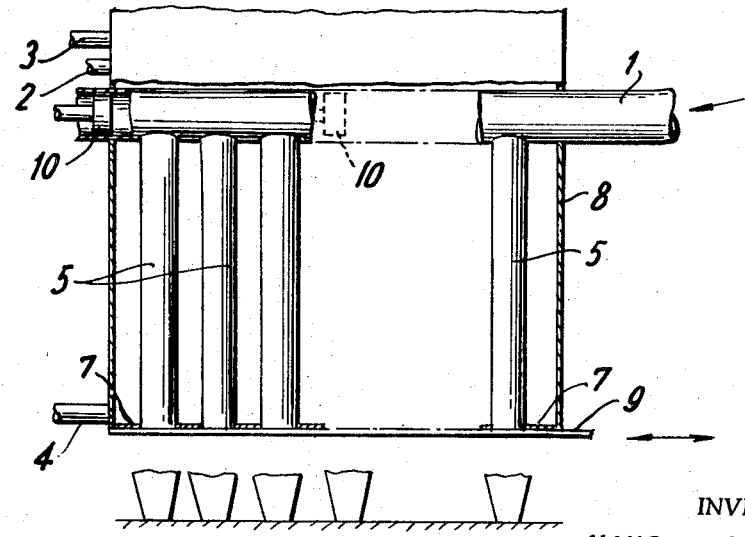
FIG.2

3,541,686
Patented Nov. 24, 1970

3,541,686
METHOD AND APPARATUS FOR DRAINING CURDS AND FORMING CHEESE
Hans Koopmans, 16 A. H. van de Venstraat, Bolsward, Netherlands
Filed Sept. 27, 1968, Ser. No. 763,309
Claims priority, application Netherlands, Oct. 4, 1967, 6713462
Int. Cl. A01j 25/10
U.S. Cl. 31—46                12 Claims

ABSTRACT OF THE DISCLOSURE

The present invention provides a method and apparatus for draining curds and forming cheese wherein whey is introduced into vertical pipes, curd is then introduced into the pipes, the whey is then removed in a manner so as to prevent the introduction of air into the system. The curd is then allowed to settle and the resultant cheese is removed.

---

Figure 3:
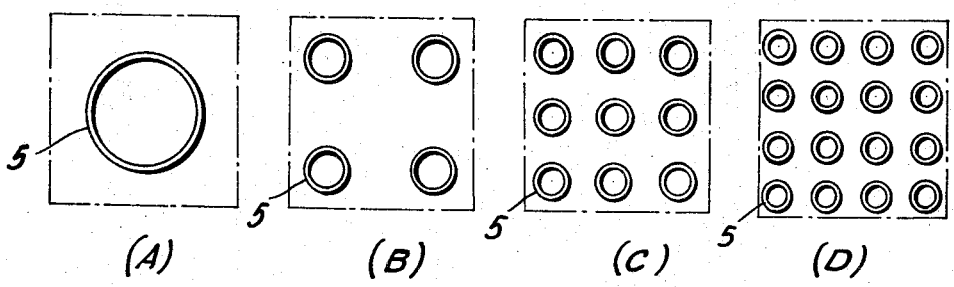

The present invention relates to a method and apparatus for draining cheese curds and forming cheese.

Apart from the classical method of draining cheese curds and of the subsequent formation of cheese there is now known a continuous method in which the contents of a cheese-vat are continuously supplied so that the curds can settle to make the cheese.

However, this latter method has the disadvantage that it is only suitable for making cheese units of one kg. at the most. Additionally, the cheese contains a great quantity of air, which as is known in the art, is undesirable.

The present invention has for its object the provision of a universal method of draining cheese curds and of forming cheese units, even up to 20 kgs., whereas air occlusions are avoided. The system generally comprises a trough having vertical, perforated pipes. The trough is filled with whey and vented. After such venting, the contents of a cheese-vat or curd container are fed through the vertical pipes, the whey being dispelled from the pipes and flowing out of the system through an overflow outlet and/or tap so that no air can penetrate. The whey is conducted away from the system after the curds have settled in the pipes, the solid cheese being then allowed to sink out of each of the pipes into the vessels arranged beneath the pipes, which are then closed until the next set of empty vessels are put beneath them.

According to the present invention, it is preferred that the curds be compressed in the perforated pipes by means of pistons after the whey is conducted away from the system. This method has the advantage that the whey content of the curds is further reduced and that the curd column has a much greater consistency and will not break off when slipping down and being cut.

While this provides some discontinuity in the process, it provides an advantage because the contents of a cheese-vat or curd container become available at given time intervals, and in practice the intermediate storage can be replaced by continuation of the manufacturing process.

The system for carrying out the method according to the present invention may comprise one or more horizontal ducts having connected with them one or more vertical, perforated pipes surrounded by a vessel or casing. A displaceable plate, which may additionally serve as a knife is positioned at the lower ends of the vertical pipes.

In this system the ends of the horizontal feeding ducts may be closed by a displaceable piston which way be positioned to block some of the vertical perforated pipes communicating therewith so that a selective number of vertical pipes may be employed at will.

In the system according to the invention each of the perforated pipes may also include a displaceable piston. The piston rods may be fastened to a common plate arranged horizontally above the system and adapted to be moved up and down, for example, by means of one or more double-action hydraulic pistons.

In order to obtain a desired closure for the lower ends of the vertical pipes, the displaceable plate employed as a closure means may be provided, for example, with means such as pressure cylinders. The lower horizontal plate which additionally serves as a knife may be displaced in a conventional manner, for example, also with the aid of pressure cylinders.

The invention will be described more fully with reference to a few embodiments of systems suitable for carrying out the method in accordance with the present invention, in which FIG. 1A shows a side and FIG. 1B a front elevation partly in section respectively of an embodiment having a central feeding duct, and FIG. 2 shows an embodiment having one or more horizontal feeding ducts, and FIG. 3A–D shows a few forms of pipe groups.

Figure 4A:
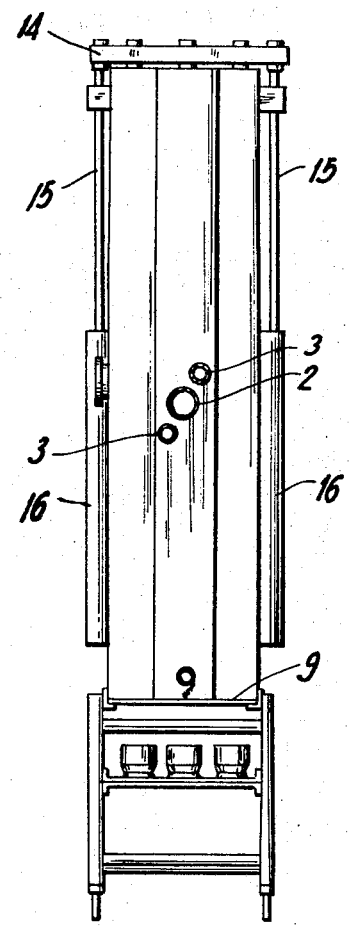
Figure 4B:
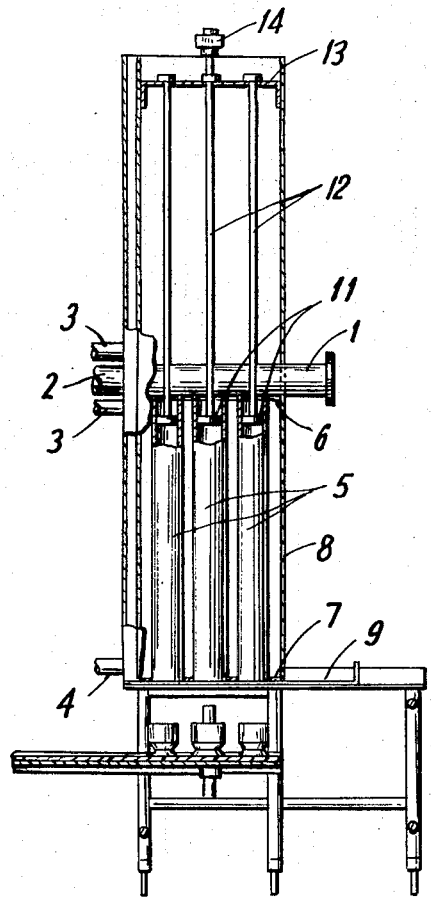

FIG. 4A shows a side embodiment and FIG. 4B a front respectively of an embodiment in which pressure pistons are provided in the pipes.

As hereinafter described, reference of FIGS. 1A and 1B shall generically be referred to as FIG. 1 and reference to FIGS. 4A and 4B shall be generically referred to as FIG. 4.

Referring to the figures, reference numeral 1 designates the feeding duct for the mass contained in a cheese-vat or curd container. The numeral 2 designates the whey feeding duct and the numeral 3 designates the venting duct. The numeral 4 denotes the outlet duct for the whey contained in the system. The vertical pipes 5 are perforated and fastened along their upper ends in the duct 1 to a plate 6. The lower ends of the pipes 5 are arranged by a spacer 7. A group or plurality of pipes 5 are surrounded as a whole or in several groups by a casing or vessel 8 and the lower ends of the pipes 5 are closed by a plate 9 which, as aforementioned, may serve in addition as a cutting plate.

FIGS. 3A to 3D show a few groups of pipes. FIG. 3A shows a pipe, for example, for a Gouda cheese of 10 to 16 kgs. FIG. 3B shows a group of four pipes for Edam cheese of 2 kgs. FIG. 3C shows a group of pipes for Baby Edam cheese of 1 kg. and FIG. 3D shows a group of pipes for small lunch cheese. The closing gate 9 may be formed so as to provide a mating pattern of surface and openings with respect to the relative distance between the pipes 5. When the plate 9 is laterally displaced so as to position a surface position in juxtaposition with a pipe 5 opening, the pipe 5 ends will be closed.

It should be noted that the plate 9 may be provided with peripheral handles and disposed in a lateral diagonal manner since such permits the utilizing of the surrounding plate surface about the plate openings as pipe-end closure surfaces.

It is appreciated that the entire plate 9 may be removed, in which instance the plate 9 need not have any openings or pattern thereon.

In the embodiment shown in FIG. 2, the horizontal duct 1 includes a piston 10 which may occupy several positions so that either all pipes 5 communicating with the duct 1 or some of them can be used. By shifting of the piston, a blockage can be effected on the pipes 5.

The embodiment shown in FIG. 4 is substantially identical to that of FIG. 1 with the exception that each pipe 5 includes a piston and that the curd feeding duct 1 is laterally disposed so as not to hinder the direction of movement of the pistons. The pistons 11 are fastened to piston rods 12, which are screwed to a common plate 13, having vertically bent-over flanges and adapted to slide along the inner walls of the device. The central piston rods 12 are prolonged at the upper end and secured by screws to a horizontal member 14, the two ends of which protrude from the body of the device and are secured to vertical piston rods 15 of double-action hydraulic cylinders 16. The stroke of the pistons of these hydraulic cylinders is chosen so that the pistons 11 can be completely moved out of the pipes 5, while the length of the stroke thereof is such that, if necessary, the pistons 11 can be moved down to the lower ends of the pipes 5. The hydraulic circuit of the hydraulic cylinders 16 includes the required control members for adjusting the pressure exerted on the curd mass in accordance with the properties of the curds.

The method according to the present invention is carried out with the system described as follows. Through the feeding duct 2 the whole system is filled with whey from a whey trough, the venting duct 3 allowing all air to escape. The vertical pipes are then closed, as is the closing member of the outlet duct 4. After the system is filled, the whey feeding duct 2 is closed and the mass contained in the cheese-vat or a curd container flows into the feeding duct 1, or the mass is pumped into it by means of a so-called curd pump. Since the mass is heavier and can flow by the whey in the vertical pipes into the vertical perforated pipes, the redundant whey will flow out of the system through the overflow and the vent 3 until the vertical pipes are completely filled with the mass. As a matter of course, in the embodiment shown in FIG. 1, the mass still present in the feeding duct 1 can subsequently flow into the pipes, since the curds will settle and the whey can flow off through the overflow 3.

After the curds have completely settled, the whey is tapped from the completely filled system through the outlet duct 4. If desired, the curds may be allowed to settle further, since it is now possible to conduct away the whey directly without any risk of air penetrating into the settled curds.

By displacing the plate 9 the curds can then be allowed to sink out of the vertical pipes into the prepared cheese troughs in such quantities that the vessels are filled to the desired level, after which the pipes are closed. The curds are allowed to sink out of the vertical pipes as many times as cheese vessels have to be filled until the pipes are completely empty.

In the embodiment shown in FIG. 4, the pistons 11 will be introduced into the pipes 5, after the whey is tapped off. The pressure is adjusted so that the curds are sufficiently compressed in the pipes 5, however, without being pressed through the perforations. Since the curds are not compressed until the whey has been tapped off, the curds will therefore already be comparatively dry. Thus, the pressure exerted may be comparatively high so that homogenous and dry cheese is obtained.

In order to render such a system suitable for all kinds of cheese, complete groups of pipes may be arranged, for example, in the embodiment shown in FIG. 1, with a matching plate 9. Moreover, the table carrying the cheese vessels may be adapted to be displaced in a direction of height.

The terms and expressions which are employed are used as terms of description; it is recognized, though, that various modifications are possible within the scope of the invention claimed.

Having thus described certain forms of the invention in some detail, what is claimed is:

1. A method of draining cheese curds and of forming cheese comprising the step of sequentially filling a substantially liquid tight vessel including at least one substantially vertical perforated pipe spaced from the wall of said vessel and passing therethrough with whey, supplying cheese curds to said pipe, settling said cheese curds in said pipe, draining substantially all the whey from said vessel, whereby air is inhibited from penetrating said cheese curd in said pipes, and removing the resultant cheese from said pipes.

2. The method as claimed in claim 1 further comprising the step of further settling said curds in said perforated pipes subsequent to the draining of said whey.

3. The method as claimed in claim 1 further comprising the step of compressing said curds in said pipes subsequent to draining of said whey.

4. An apparatus for draining cheese curds and forming cheese comprising a substantially liquid tight vessel, at least one substantially vertical perforated pipe in said vessel spaced from the wall of said vessels, means to close said pipe at its lower end, means to deliver cheese curd to the upper end of said pipe, delivery means to introduce whey to said vessel, means to drain substantially all the whey from said vessel, whereby air is inhibited from penetrating said cheese curds in said pipes, and means to open said pipe to remove its contents.

5. The apparatus as claimed in claim 4 including a plurality of vertical pipes.

6. The invention of claim 5 further including means to selectively open or close a selected number of said vertical pipes to said cheese curd flow.

7. The apparatus as claimed in claim 4 including means to vent said vessel substantially at the upper level of said pipe perforations.

8. The apparatus as claimed in claim 4 wherein said delivery means include at least one horizontal duct in communication with said vertical pipe.

9. The apparatus as claimed in claim 4 wherein said closure means includes a movable plate.

10. The apparatus as claimed in claim 4 further including means adapted to compress the contents of said vertical pipes.

11. The apparatus as claimed in claim 10 wherein said compressing means includes at least one piston in said vertical pipe.

12. The apparatus as claimed in claim 11 wherein said piston is hydraulically operable.

References Cited

UNITED STATES PATENTS

| | | | |
|---|---|---|---|
| 2,272,954 | 2/1942 | Sartori | 31—46 |
| 2,851,776 | 9/1958 | Czulak et al. | 31—46 |
| 3,098,297 | 7/1963 | De Boer | 31—44 |
| 3,217,411 | 11/1965 | De Boer | 31—46 |
| 3,468,026 | 9/1969 | Robertson et al. | 31—89 |

ALDRICH F. MEDBERY, Primary Examiner

U.S. Cl. X.R.

31—89; 99—243